Jan. 10, 1961 C. S. GLENNY 2,967,619
FLOUR SIFTER
Filed Dec. 20, 1956

Inventor
Clarence S. Glenny

United States Patent Office 2,967,619
Patented Jan. 10, 1961

2,967,619

FLOUR SIFTER

Clarence S. Glenny, Rockford, Ill., assignor to The Washburn Company, Worcester, Mass., a corporation of Massachusetts Filed Dec. 20, 1956, Ser. No. 629,688

1 Claim. (Cl. 209—357)

This invention relates to flour sifters and is more particularly concerned with a handle operated type of sifter wherein the agitator is oscillatable by closing the generally U-shaped handle, one leg of which is rigidly secured to the side of the sifter body and the other leg of which has an inwardly bent end portion that is pivotally connected with a radius arm provided on the pivoted end of the agitator extending from the sifter body.

For simplicity and economy of manufacture, an inwardly bent end portion on the U-shaped handle serves as an attaching portion abutting the outer side of the sifter body while a longitudinally ribbed bearing and cover plate for the upright oscillatable shaft portion of the agitator is disposed in abutment with the inner side of the sifter body covering the hole provided in said body through which the operating arm on the upper end of the upright shaft portion extends for operating connection with the movable portion of the handle, these two plates having rivets entered therethrough and through holes in the sifter body to fasten the plates together for a simple and economical and also thoroughly sanitary construction.

For further simplicity and economy in construction, as well as good sanitation, the lower tapered discharge spout portion of the sifter body has a cylindrical upper rim portion over which a flat sifter screen is stretched with its marginal edge portion bent downwardly around said rim portion for fastening the same in place, this assembly being pressed into the lower portion of the sifter body up against an inwardly projecting annular bead formed therein, after which it is only necessary to bend inwardly the lower edge portion of the body onto the taper of the spout to complete the assembly, giving the sifter a neat and attractive external appearance while at the same time avoiding leaving any crevices on the inside of the sifter around the edges of the screen where flour could collect and spoil.

The invention is illustrated in the accompanying drawing, in which—

The same reference numerals are applied to corresponding parts in these three views.

Figure 2:
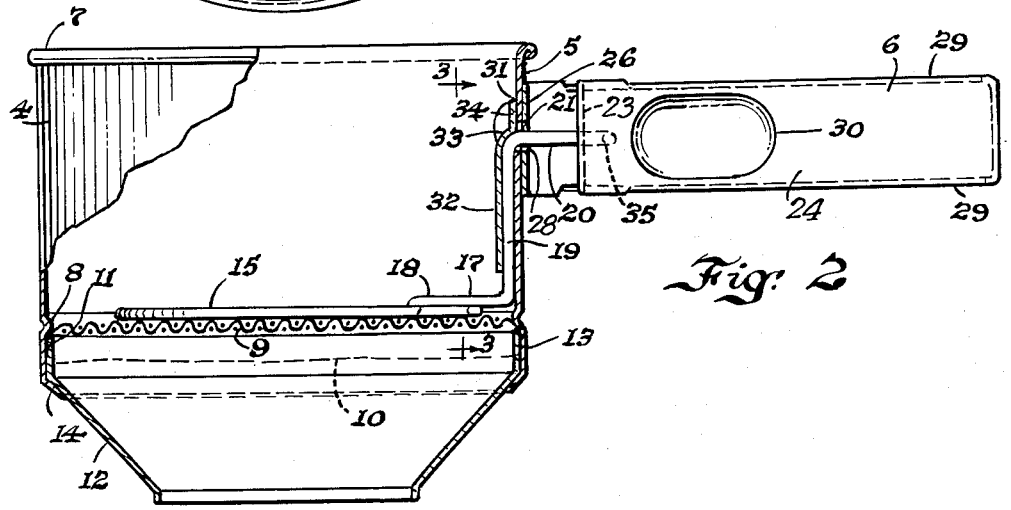
Fig. 2 is a side view of the sifter with the body thereof shown in vertical cross-section on the line 2—2 of Fig. 1.
Figure 3:
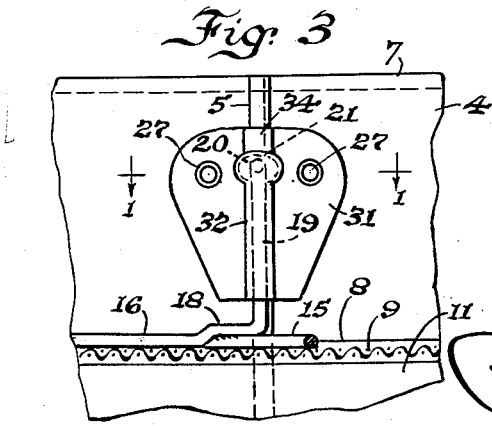
Fig. 3 is a face view of one side of the inside of the sifter body taken in the plane of the line 3—3 of Fig. 2.

Referring to the drawing, the flour sifter comprises a cylindrical shell or body 4 made from a single piece of sheet metal, the ends of which are secured together forming a vertical seam 5 lengthwise of one side of the body adjacent the handle 6. The top of the body is defined by a rolled edge 7 so that no raw edges are left exposed. There is an annular bead 8 formed in the body near the bottom and under this bead the circular flat wire screen 9 used for sifting is wedgingly engaged around its periphery, the marginal edge portion 10 being bent downwardly around the cylindrical upper rim portion 11 of a seamless sheet metal tapered discharge spout 12 that has a tight fit inside the lower portion 13 of the body 4 and is held securely in place by the inwardly bent lower edge portion 14 of the body which conforms to the taper of the spout 12, as clearly appears in Fig. 2. It is clear that with this construction there are no crevices left on the inside of the sifter around the edges of the screen 9 where flour could collect and spoil, putting the sifter in unsanitary condition.

Figure 1:
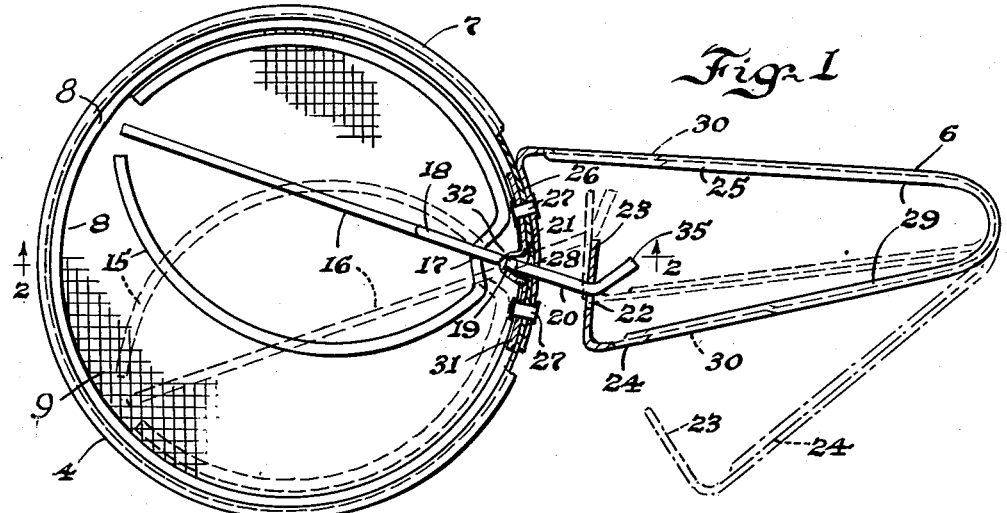
Fig. 1 is a plan view of a flour sifter made in accordance with my invention with a portion shown in horizontal section on the line 1—1 of Fig. 3 to better illustrate the construction.

A generally elliptical flat wire agitator 15 has a wire arm 16 on its center line welded to the top thereof at 17 where the arm 16 has an upwardly offset end portion 18, the rest of the arm 16 being disposed with the agitator in contact with the upper surface of the screen 9 to help in the agitation of the flour and accordingly produce the sifting action. The agitator 15 is oscillatable about a vertical axis defined by an upwardly bent shaft portion 19 provided on one end of the offset end portion 18 of the arm 16. At the upper end of the shaft portion 19 is a radius arm 20 for oscillation of the shaft and the agitator with it, this arm being bent at right angles to the shaft 19 and extending through a hole 21 provided in the seamed portion 5 of the body 4 for oscillation by means of the handle 6. The latter is of one-piece spring steel strip construction and is operatively connected to the arm 20 by entry of it in an opening 22 provided in an inwardly bent end portion 23 on one leg 24 of the U defined by said handle. The other leg 25 of the U is slightly longer than the leg 24 and has an inwardly bent end portion 26 that serves as an attaching portion and is riveted, as at 27, to the outer side of the body 4 crosswise with respect to the seamed portion 5. An opening 28 in the attaching portion 26 registers with the hole 21 for extension therethrough of the arm 20. The upper and lower longitudinal edges of the handle 6 are curved inwardly, as indicated at 29, to lend stiffness and strength to the handle and conceal the edges of the strip of which it is formed and present rounded edges for a better feel in the hand of the operator. Inwardly bent elliptical portions 30 of the legs 24 and 25 between the rounded upper and lower edges serve as finger grips to provide a better hold, one of these depressions receiving the thumb of the operator's hand while the other receives the middle portion of the index finger to facilitate closing the handle for operation of the agitator. The handle 6, if it were not attached to the arm 20, would expand approximately to the extent indicated in the dot and dash line showing of arm 24 in Fig. 1. Consequently, since the handle tends to spread, when the thumb pressure is released from the arm 24 it moves away from arm 25, moving the agitator 15 under appreciable spring pressure against one side of the body 4, as shown in full lines in Fig. 1, but when the arm 24 is pressed inwardly toward arm 25 to the dotted line position shown in Fig. 1, the agitator 15 is moved to its other extreme position indicated in dotted lines in Fig. 1 in contact with the diametrically opposite side of the body 4.

For bearing support of the shaft portion 19 of the agitator 15 and to cover up the hole 21 at the same time, a longitudinally ribbed bearing and cover plate 31 is provided, the deeper rib portion 32 of which serves as a bearing for the shaft portion 19. At the upper end 33 of the rib portion 32 where the wall of the rib is curved to follow more or less the curvature of the bend in the wire at arm 20 there is a connection with the shallower ribbed portion 34 that straddles closely the seamed portion 5 of the shell above the hole 21. The rivets 27 previously mentioned extend through holes in the plate 31 registering with holes in the shell 4 and in the attaching portion 26 of the handle, whereby to fasten the three parts together securely with the two rivets for a simple and economical construction and one which is also thoroughly sanitary, it being manifest that what little flour might find its way into the bearing defined by the rib 32 will tend to drop out by gravity, and there is no other place where flour could collect and spoil.

In the manufacture of these sifters the shell or body 4 can have its screen 9 and spout 12 assembled therein before the agitator 15 is inserted and plate 31 is riveted to the body with the attaching portion 26 of the handle 6. There is sufficient give in the handle 6 to enable easily connecting the inwardly bent end portion 23 of the handle with the bent end portion 35 of the arm 20. The bend 35 reduces likelihood of the handle becoming disconnected from the agitator once the two parts have been connected in the manner shown. The one hand operation described is ideal, because it leaves the other hand of the operator free to do stirring and spreading, it being well known that flour sifters are used for sifting many other ingredients besides flour, and in many cooking and baking operations where a sifter is required it is important that the sifter be operable easily with one hand. When the handle is squeezed the sifter sifts and when the handle is released slightly it sifts again, and so the operator has a means of nicely controlling the sifting and there is no likelihood of sifting too much at a time.

It is believed the foregoing description conveys a good understanding of the objects and advantages of my invention. The appended claim has been drawn to cover all legitimate modifications and adaptations.

I claim:

A sifter comprising a generally cylindrical body having a flat sifter screen mounted therein in a transverse plane, an agitator oscillatable on said screen about a vertical axis located in one side of said body and having a vertically extending shaft rigid therewith disposed on said axis, said shaft having its upper end portion bent horizontally to define an operating radius arm rigid with its upper end extending outwardly through an opening provided in one side of said body for oscillation, a generally U-shaped openable and closeable handle disposed radially outwardly from the same side of said body as said arm and adjacent the same, the cross portion of the U being outermost, said handle having laterally extending portions on the inner ends of the two legs of the U, one of which extends from its associated arm toward the other arm and is spaced from and movable relative to said body and is pivotally connected with the aforesaid agitator radius arm, and the other of which extends from its associated arm toward the other arm and has abutment with the outer side of said body and is adapted to be secured thereto as an attaching portion, a plate curved to conform to and abutting the inner side of said body and closing said opening from the inside of said body and defining a bearing for said shaft that is closed at the top where the bearing engages the bent portion of the shaft at the inner end of the radius arm to prevent upward displacement of said agitator from close contact with said screen, said plate having the lower end thereof spaced appreciably above said screen and agitator, and a single means for securing said handle attaching portion and said agitator bearing plate to opposite sides of the wall of said body.

References Cited in the file of this patent

UNITED STATES PATENTS

| | | |
|---|---|---|
| 196,584 | Ketcham | Oct. 30, 1877 |
| 219,173 | O'Toole | Sept. 2, 1879 |
| 221,322 | Kennedy | Nov. 4, 1879 |
| 542,476 | House | July 9, 1895 |
| 825,014 | Treleaven | July 3, 1906 |
| 971,875 | Andrews | Oct. 4, 1910 |
| 1,167,927 | Pfalzgraf | Jan. 11, 1916 |
| 1,398,367 | Earle | Nov. 29, 1921 |
| 1,955,847 | Dickey | Apr. 24, 1934 |
| 2,242,583 | Kuck | May 20, 1941 |
| 2,314,186 | Zuck | Mar. 16, 1943 |
| 2,326,762 | Collier | Aug. 17, 1943 |
| 2,507,960 | Chester | May 16, 1950 |
| 2,592,850 | Barbery | Apr. 15, 1952 |